(No Model.) 3 Sheets—Sheet 1.
H. P. DAVIS.
CONTROLLER FOR ELECTRIC MOTORS.

No. 582,114. Patented May 4, 1897.

WITNESSES: INVENTOR.
Harry P. Davis
BY
Terry, MacKaye & Carr
ATTORNEYS.

(No Model.) 3 Sheets—Sheet 2.

H. P. DAVIS.
CONTROLLER FOR ELECTRIC MOTORS.

No. 582,114. Patented May 4, 1897.

WITNESSES:
Ethan I. Dodds
Hubert C. Tener

INVENTOR
Harry P. Davis
BY
Terry, MacKaye & Carr
ATTORNEYS.

(No Model.) 3 Sheets—Sheet 3.
H. P. DAVIS.
CONTROLLER FOR ELECTRIC MOTORS.
No. 582,114. Patented May 4, 1897.
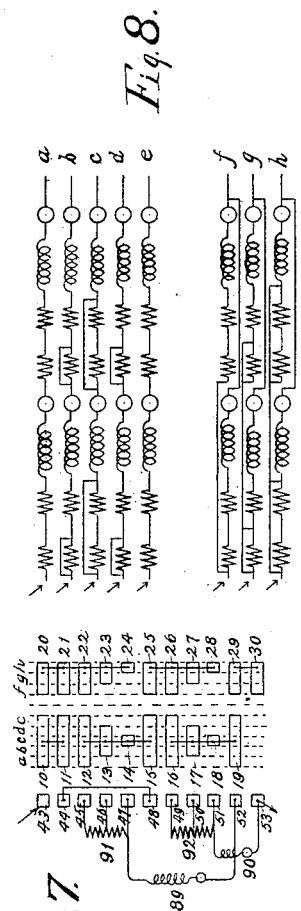
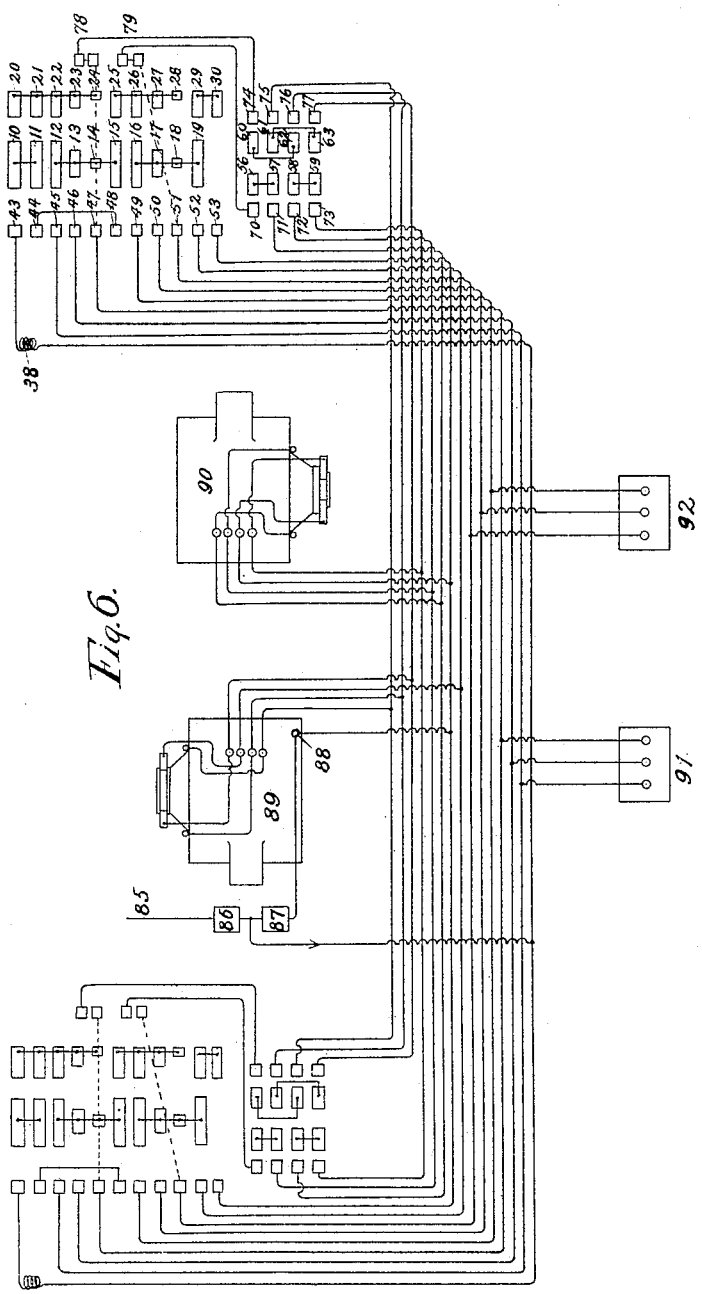
WITNESSES
Ethan I. Dodds
Hubert C. Tener
INVENTOR,
Harry P. Davis
BY
Terry, MacKay & Carr
ATTORNEYS.

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF SAME PLACE.

CONTROLLER FOR ELECTRIC MOTORS.

SPECIFICATION forming part of Letters Patent No. 582,114, dated May 4, 1897.

Application filed January 14, 1895. Serial No. 534,831. (No model.)

*To all whom it may concern:*

Be it known that I, HARRY P. DAVIS, a citizen of the United States, residing at Pittsburg, in the county of Allegheny and State of Pennsylvania, have invented a new and useful Improvement in Controllers for Electric Motors, (Case No. 625,) of which the following is a specification.

My invention relates to methods of and means for controlling electric motors, and more particularly to such motors as are employed for the propulsion of railway-vehicles; and it has for its object to provide such a method and apparatus which will serve to make the necessary changes in connections effectively, which will serve to obviate, as far as possible, injury to the controller-contacts by the formation of arcs when the connections are changed, and which shall have a minimum number of operating parts consistent with satisfactory operation and the results which it is desired to obtain.

Figure 1:
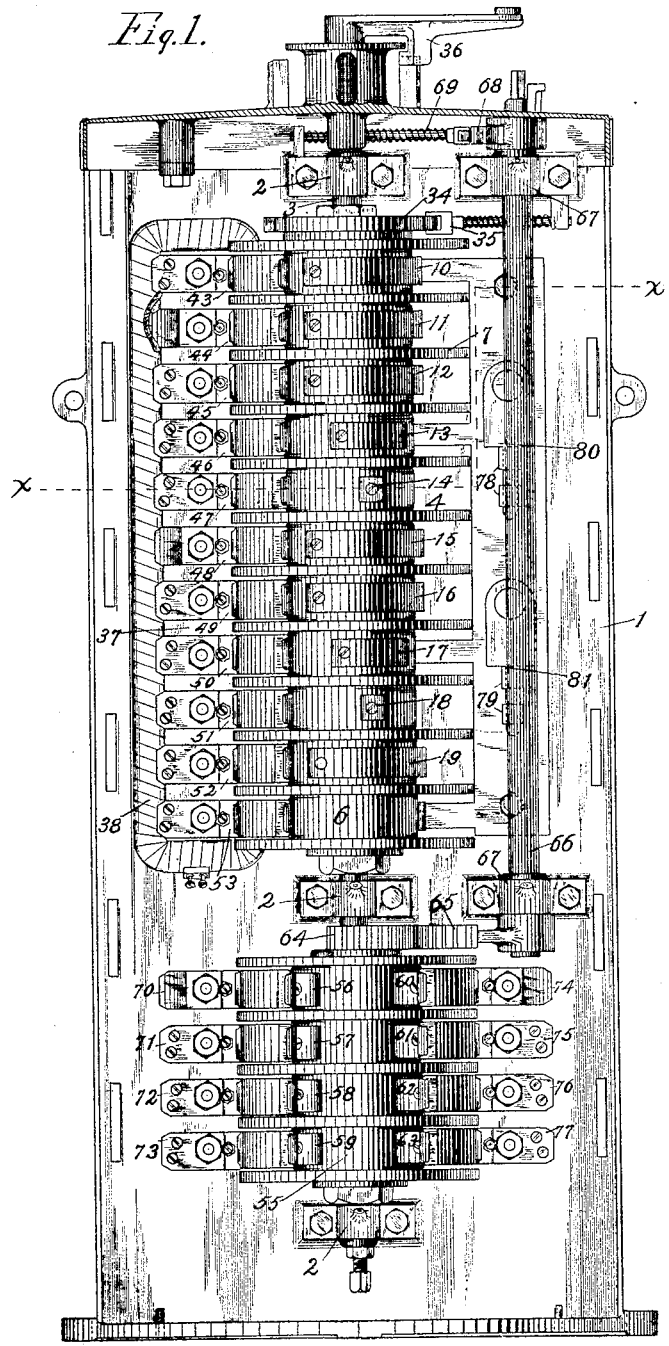
Figure 3:
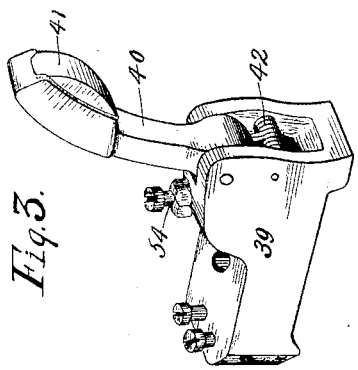
Figure 2:
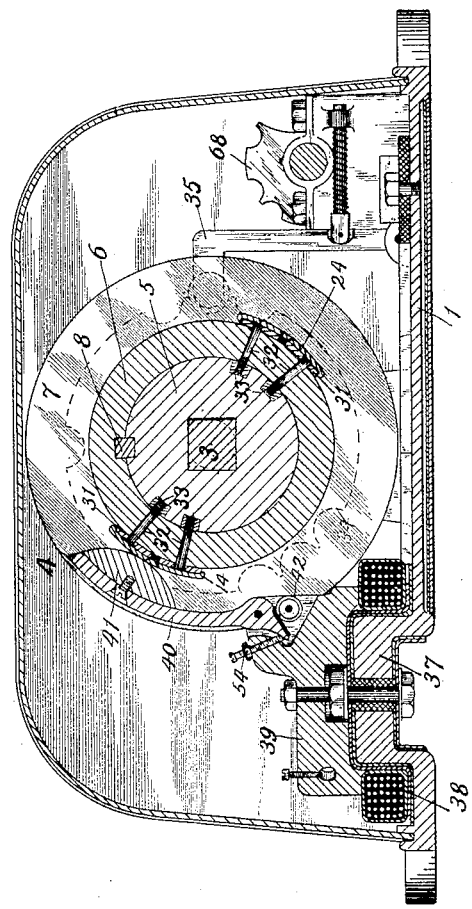
Figure 4:
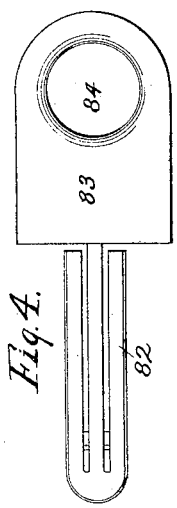

In the drawings, Figure 1 is a front elevation of a controller-stand and its operating parts, the cover and wiring being omitted. Fig. 2 is an enlarged transverse section through the entire device, taken on line $x\,x$ of Fig. 1. Fig. 3 is an enlarged perspective view of one of the stationary contact devices. Fig. 4 is a side view, and Fig. 5 an edge view, of one of the motor cut-out plugs. Fig. 6 is a diagram showing the circuits and connections employed on a car operated by two motors. Fig. 7 is a diagram of the movable and stationary parts of the controller, showing the connection of the motors and rheostats with the stationary contacts; and Fig. 8 is a diagram showing the several relations of the rheostats and motors for the various positions of the controller-drum in operation.

Referring more particularly to the drawings, 1 is the base of the controller, which is designed to be attached to the dashboard on the platform of a car in the usual manner.

2 are bearings on the base 1, in which is mounted a shaft 3. On this shaft is rigidly mounted the controller cylinder or drum 4, that portion of the shaft which carries the cylinder or drum being square in cross-section, as shown in Fig. 2. This drum or cylinder consists of the inner cylinder 5, on which are mounted the non-conducting rings 6 and washers 7, both rings and washers being held to rotate with the cylinder 5 by means of a spline 8. Supported upon the said rings 6 are iron plates or blocks 31, which are fastened to conducting pieces or strips 33, set into the cylinder 5, by means of screws 32, the strips 33 being employed for making the necessary electrical connections between the copper contact-strips on the surface of the controller-drum, substantially as shown in an application filed by Albert Schmid and myself January 17, 1895, Serial No. 535,212. These contact plates or strips, numbered 10 to 30, are suitably fastened to the blocks or plates 31, preferably by means of screws, as shown. Fastened rigidly to one end of the controller-drum is a notched disk 34, with which engages a spring-pressed holding-pawl 35. This disk and holding-pawl are employed for the purpose of indicating to the motorman the points where changes in the connections occur, and thus enabling him to make the proper manipulations of the controller-drum without looking at the controller-stand. The drum is rotated by means of a crank 36, the handle for operating the same being omitted from the drawings.

37 is an oblong iron boss which is formed integral with the base 1 and constitutes the pole or core of a magnetizing-coil 38, these parts extending the entire length of the controller-drum. Securely bolted to the magnet-core 37 is a series of stationary contacts, numbered 43 to 53, these contacts and bolts being well insulated from the core and coil, as clearly shown in Fig. 2 of the drawings. Each of these contacts consists of an iron base 39 and an iron extension or finger 40, pivoted thereto and extending upward along one side of the drum 4. Each of these extensions or fingers 40 is provided with a copper contact-shoe 41, rigidly attached thereto by means of inwardly-inclined lips or flanges and a screw, as shown, or in any other desired manner. A coiled spring 42 bears against the rearwardly-extending end of the finger 40 and tends to press the contact-shoe 41 against the drum 4. The pressure exerted by this spring is regulated and the position of the finger 40 determined by means of the set-screw and nut 54. The base portions of the stationary contacts are provided with perforations and binding-screws for connecting the necessary conductors therewith.

It will be readily understood from the foregoing description and the accompanying illustration that any injurious arcs which may form or tend to form between the movable and stationary contacts upon the separation of the same will be interrupted by the magnetic lines of force produced by the coil 38 and flowing through the pole 37, the stationary contact bases and fingers, the drum, and the base 1. By extending the magnet alongside the controller-drum and utilizing the stationary current-conducting contacts as pole-pieces therefor I am enabled to employ the least number of parts consistent with successful operation and at the same time to secure a compact arrangement of the same. I am also enabled by this feature of my invention to localize the magnetic lines of force where they will be most effective and to insure an equal magnetization of all of the contact-fingers.

The reversing switch-cylinder 55 is carried by a sleeve loosely mounted on the lower end of the shaft 3, and is provided with contact-strips, numbered 56 to 63. The drum 55 also carries on its upper end a segment-gear 64, with which meshes a similar gear 65, carried by a shaft 56, the latter being rotatable in bearings 67 on the base 1. The shaft 66 has a squared upper end for the reception of a handle to be employed for rotating the same and carries a notched segment 68 with which engages a spring-pressed pawl 69, these parts being designed to insure the retention of the reversing-drum in the proper position to effect the particular results desired.

The stationary contacts 70 to 77 are the same in all respects in structure as those heretofore described as operating in connection with the controller-drum, though they may be made of non-magnetic metal, and each finger may be made in one piece, if desired.

78 and 79 are terminals through which connection is made between the reversing-switch and the stationary contacts 47 and 51 of the controller, and 80 and 81 are cut-out plugs, either or both of which may be readily moved from their sockets in the terminals 78 and 79 when desired in order to cut either or both of the motors out of circuit.

Figure 5:
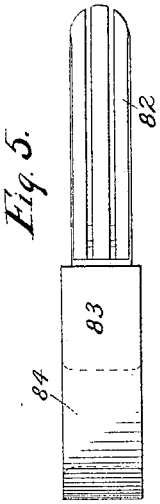

In order to facilitate the ready insertion and removal of the cut-out plugs and to insure good electrical connection between the same and the terminals, I construct each of them substantially as shown in Figs. 4 and 5 of the drawings.

82 is the portion of the plug which fits in the terminal sockets and is preferably in the form of a cylinder having a rounded end. This cylinder is split from the base nearly to the rounded end, so as to form three separated longitudinal strips, connected at their outer ends, the outside strips being free at their inner ends, as shown in Fig. 4. The middle strip is firmly seated in a base or handle 83, formed of insulating material and provided with an opening 84 in order that the handle may be readily and firmly grasped when it is desired to insert the plug in or remove it from the sockets in the terminals. The metal portion 82 of the plug is also split longitudinally from the outer or rounded end nearly to the base or inner end into three separated strips, the slits being at right angles to those above described. It will thus be seen that by reason of the structure described the part 82 may be compressed sufficiently to permit of its ready insertion into the terminal sockets, and that, when inserted, the resiliency of the metal will serve to effect a close fit between the said parts, thus insuring a good electrical connection.

Referring now more particularly to Figs. 4, 5, and 6, 85 represents the conductor through which the current is led into the apparatus. 86 is a safety-fuse block, 87 a lightning-arrester, 88 the ground connection, and 89 and 90 the two motors which are preferably employed for operating a car. 91 and 92 are rheostats, each of which is divided into two sections in order that either the whole or only a part of the resistance may be included in the circuit, as may be desired.

In describing the operation of the apparatus and system it will be necessary to make reference to only one of the controllers, since the two are exact duplicates in both structure and operation. Referring, therefore, to the controller illustrated diagrammatically at the right of Fig. 6, and assuming that the car is moving in the direction indicated by the feathered arrow, the connections and changes will be as follows in the various positions of the controller-drum.

Assuming that the stationary contacts 70, 71, 72, and 73 of the reversing-switch are resting upon the contacts 56, 57, 58, and 59 and that the contacts 74, 75, 76, and 77 are resting upon the contacts 60, 61, 62, and 63 in the first position of the controller-drum (designated as a,) the circuit will be through contacts 43, 10, 11, 44, 48, 15, 12, and 45 to the rheostat 91, through both resistances to contact 47, through terminals 78 and plug 80 and contacts 74, 60, 62, and 76 of the reversing-switch to motor 89, through the motor field-magnets to contact 75, through contacts 61, 63, and 77 of the reversing-switch, through the armature of the motor 89 to contact 52, through contacts 19, 16, and 49 to rheostat 92, through both resistances to contact 51, through terminals 79 and plug 81 and contacts 70, 56, 57, and 71 of the reversing-switch, through the field-magnets of motor 90 to and through contacts 72, 58, 59, and 73 of the reversing-switch to and through the armature of motor 90 to the ground. In this position of the controller-drum it will be observed that the motors are connected in series and that all of the resistances are included directly in the circuit, and that consequently the minimum amount of current will pass and the motors will run at their lowest speed. In the second position of the controller-drum (designated by $b$,) it will be readily seen that the circuits are the same as illustrated in position $a$, except that a portion of the resistance in each of the rheostats 88 and 89 is cut out, leaving the remaining resistances and the two motors in series and thus permitting the passage of an additional amount of current, and consequently the running of the motors at a higher rate of speed. In position $c$ both rheostats are entirely cut out, thus leaving the two motors in series without external resistance and provided with the maximum flow of current and therefore with the maximum speed which may be attained when the two motors are in series. In order to secure a higher rate of speed, it is necessary to change the connection of the motors from series to parallel, but unless the amount of current flowing is cut down before making the change there will be injurious arcing at the controller-contacts and a possibility of other disarrangement incident to making such change. I therefore provide the additional changes indicated at positions $d$ and $e$, in the former of which a portion, preferably one-half, of the resistance of each rheostat is inserted, and in position $e$ the entire resistance is inserted, the relation of motors and resistances being the same in these two positions as in positions $a$ and $b$, except that in the latter the change is from greater to less resistance and in the former from less to greater. The change from position $c$ to position $e$ is made so quickly that the speed of the car will not be affected, since it will have sufficient momentum, acquired while the controller is in position $c$, to permit of this cutting down of the current in order to make the change from series to parallel connection without affecting materially the speed of the car. In the next two positions of the controller-drum (not designated by letters of reference) the entire circuit is broken, both motors and both rheostats being cut out. What was stated above in regard to the speed of the car being practically unaffected by the change from position $c$ to $e$ applies also to the movement of the drum through the two positions just referred to. In position $f$ the two motors are placed in parallel, the resistances of rheostat 91 being in series with motor 89 and those of rheostat 92 in series with motor 90. In position $g$ the motors are also in parallel, a part of the resistance of each rheostat being cut out in order to secure an increased flow of current, and consequently increased speed, and in position $h$ the motors are in parallel with all of the resistance cut out, thus providing for the maximum flow of current and maximum speed of the car.

The circuits, when motor 90 is cut out by the removal of plug 80 from terminals 79, are as follows: Starting when the stationary contacts are in position $f$ on the controller-drum the circuit is completed through contacts 43, 20, 22, and 45, rheostat 91, contacts 47, terminals 78, and plug 80, reversing-switch contacts 74, 60, 62, and 76, the motor field-magnet, reversing-switch contacts 75, 61, 63, and 77, the motor-armature, and contacts 52, 29, 30, and 53 to the ground. In position $g$ a portion of the resistance of rheostat 91 is cut out, and in position $h$ the motor is in circuit without resistance.

If the motor 89 be cut out by removing the plug 80 from terminals 78 and the controller be moved through the positions above described, the circuit will be, first, through the entire resistance of rheostat 92 and motor 90; second, through a portion of the resistance and the motor, and, third, through the motor without resistance, as will be readily seen without tracing the circuits in detail.

It is to be observed that in each position of the controller-cylinder—except, of course, when the circuit is entirely broken—the current passes through the magnet-coil 38 before entering the controller. It will be readily understood, without tracing the circuits and connections in detail, that if the drum of the reversing-switch be rotated so that the contacts 74 to 77 rest upon the contacts 56 to 59, and the contacts 70 to 73 rest upon contacts 60 to 63, the direction of rotation of the motor-armatures will be in the opposite direction from that hereinbefore described.

While I have described certain specific details of construction as illustrative of my invention, I do not wish to be understood as limiting my invention thereto, for such details may be widely varied without departing from the spirit or scope of the invention.

I claim as my invention—

1. The method of controlling the movement of mechanism driven by two electric motors comprising the following steps, connecting said motors in series with resistances, opening the entire circuit, coupling the motors in parallel with resistances and cutting out the resistances, substantially as described.

2. The method of regulating the power and speed of mechanism driven by two electric motors which consists in the following steps, connecting said motors in series with resistances, cutting out the resistances in order to reach a running position, again inserting the resistances, opening the entire circuit, coupling the motors in parallel with resistances, and finally cutting out the resistances, substantially as described.

3. The method of regulating the power and speed of mechanism driven by two electric motors which consists in the following steps: connecting said motors in series with resistances, cutting out a part and then the whole of the resistances in order to reach a running position, inserting a part and then the whole of the resistances, opening the entire circuit, coupling the motors in parallel with all of the resistances in circuit, and then gradually cutting out the resistances.

4. The combination with a suitable base, of a drum having contacts, an electromagnet and a series of stationary contacts coöperating with the drum-contacts and constituting the pole-pieces of the electromagnet, substantially as described.

5. The combination with a magnetizing-coil, a contact-carrying drum, a base for supporting said coil and drum and having a core or pole for said coil formed integrally therewith, of a series of contact devices fastened to said magnet and constituting its pole-pieces, substantially as described.

6. The combination with a contact-bearing drum, of an electromagnet adjacent thereto, and a series of magnetic contact devices constituting the pole-pieces of said magnet each of which comprises a base and a finger formed of magnetizable metal and pivoted together and means for adjusting the latter on its pivot, substantially as described.

7. The combination with a contact-bearing drum, of an elongated electromagnet adjacent thereto, and a series of magnetic contact devices constituting the pole-pieces of said magnet, each of which comprises a base, a finger pivoted thereto, a spring bearing against one end of the finger and adjustable means for opposing the action of the spring, substantially as described.

8. A contact device comprising a base and a finger pivoted thereto, both being formed of magnetizable metal, said finger having a removable contact-shoe, means for changing the angular position of the finger and means for yieldingly supporting it in whatever position it is made to assume, substantially as described.

9. The combination with the controller-drum and the stationary contacts coöperating therewith, of a reversing switch-cylinder sleeved upon one end of the controller-drum shaft, an actuating-shaft for said cylinder and means between said shaft and cylinder for rotating the latter, substantially as described.

10. The combination with a controller-drum and a reversing switch-cylinder, the former being rigidly and the latter loosely mounted upon a single shaft, of stationary contacts for said drum and cylinder, a shaft mounted to rotate beside said drum and intermeshing gear-segments carried by said shaft and cylinder, substantially as described.

11. The combination with two electric motors, of a controller-drum and a reversing-cylinder carried by a single shaft, stationary contacts coöperating with said drum and cylinder, means for operating the cylinder independently of the drum and means for cutting either of said motors out of circuit, substantially as described.

12. A cut-out plug comprising an insulating base or handle and a divided contact-piece having two sets of dividing spaces or slits at an angle to each other, each of which entirely divides alternate ends of the connecting-piece, substantially as described.

13. A cut-out plug having a base and an approximately cylindrical contact-piece partially divided by sets of longitudinal spaces or slits at right angles to each other, the spaces or slits of one of said sets extending to the base and the other to the extremity of the free end of the contact-piece, substantially as described.

In testimony whereof I have hereunto subscribed my name this 10th day of January, A. D. 1895.

HARRY P. DAVIS.

Witnesses:
WESLEY G. CARR,
HUBERT C. TENER.